United States Patent
Dunbar et al.

(10) Patent No.: US 9,998,399 B2
(45) Date of Patent: Jun. 12, 2018

(54) CLOUD INDEPENDENT TUNING SERVICE FOR AUTONOMOUSLY MANAGED WORKLOADS

(71) Applicant: International Business Machines Corporation, Armonk, NY (US)

(72) Inventors: Anthony M. Dunbar, Rochester, MN (US); James J. Fall, Pine Island, MN (US); Andrew L. Hanson, Rochester, MN (US); Samuel D. Matzek, Rochester, MN (US); George J. Romano, Rochester, MN (US); Tammy L. Van Hove, Elgin, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 64 days.

(21) Appl. No.: 14/565,566

(22) Filed: Dec. 10, 2014

(65) Prior Publication Data
US 2016/0099888 A1    Apr. 7, 2016

Related U.S. Application Data

(63) Continuation of application No. 14/505,799, filed on Oct. 3, 2014.

(51) Int. Cl.
*G06F 15/173* (2006.01)
*H04L 12/911* (2013.01)
*H04L 29/08* (2006.01)
*H04L 12/917* (2013.01)

(52) U.S. Cl.
CPC ............ *H04L 47/827* (2013.01); *H04L 47/76* (2013.01); *H04L 67/1008* (2013.01)

(58) Field of Classification Search
CPC ..................................................... G06F 9/5072
See application file for complete search history.

(56) References Cited

U.S. PATENT DOCUMENTS

| | | |
|---|---|---|
| 8,161,479 B2 | 4/2012 | Sedukhin et al. |
| 8,612,599 B2 | 12/2013 | Tung et al. |
| 8,789,041 B2 | 7/2014 | Verma |

(Continued)

FOREIGN PATENT DOCUMENTS

| | | |
|---|---|---|
| WO | 2014058411 A1 | 4/2014 |
| WO | 2015192881 A1 | 12/2015 |

OTHER PUBLICATIONS

Ruiz-Alvarez et al.; "An Automated Approach to Cloud Storage Service Selection", ScienceCloud'11, Jun. 8, 2011, pp. 1-10.

(Continued)

*Primary Examiner* — Philip Chea
*Assistant Examiner* — Mohammed Ahmed
(74) *Attorney, Agent, or Firm* — Patterson + Sheridan, LLP

(57) ABSTRACT

Method to perform an operation comprising receiving, from a workload in a cloud computing environment, an abstract request to modify resources allocated to the workload, translating, by a tuning service, the abstract request to a set of requirements to fulfill the abstract request, identifying, by the tuning service, a resource configuration suitable to satisfy the set of requirements, and providing, by the tuning service, the resource configuration to fulfill the abstract request.

11 Claims, 9 Drawing Sheets

(56) References Cited

U.S. PATENT DOCUMENTS

| | | | | |
|---|---|---|---|---|
| 2010/0057831 | A1* | 3/2010 | Williamson | G06F 9/5027 709/203 |
| 2011/0041126 | A1* | 2/2011 | Levy | G06F 9/5072 718/1 |
| 2012/0047240 | A1* | 2/2012 | Keohane | G06F 9/5072 709/221 |
| 2012/0096149 | A1 | 4/2012 | Sunkara et al. | |
| 2012/0222041 | A1* | 8/2012 | Sabin | H04L 67/1008 718/105 |
| 2013/0019015 | A1* | 1/2013 | Devarakonda | G06F 9/5072 709/226 |
| 2013/0091285 | A1* | 4/2013 | Devarakonda | G06F 9/4856 709/226 |
| 2013/0097603 | A1 | 4/2013 | Amano et al. | |
| 2014/0136706 | A1* | 5/2014 | Elzur | H04L 29/08144 709/226 |
| 2014/0137112 | A1 | 5/2014 | Rigolet | |
| 2015/0052218 | A1* | 2/2015 | Zhang | G06F 9/4856 709/217 |
| 2017/0109204 | A1 | 4/2017 | Feng et al. | |

OTHER PUBLICATIONS

Redl, et al.; "Automatic SLA Matching and Provider Selection in Grid and Cloud Computing Markets", pp. 1-10, Distributed Systems Group, Institute of Information Systems Vienna University of Technology, Austria.

"Cloud Assessment Tool", retrieved Jun. 4, 2014, <http://www.asiacloud.org/index.php/20112-07-17-08-34-39/cloud-assessment>.

"Cloud Assessment Tool Launched", retrieved Jun. 4, 2014, <http://www.asiacloud.org/index.php/2012-07-17-08-33-19/2013-02-20-09-06-35/press-release-vendor-neutral-cat>.

Li et al; "CloudCmp: Shopping for a Cloud Made Easy", pp. 1-7.

Zaman et al.; "Efficient Bidding for Virtual Machine Instances in Clouds", pp. 1-2.

"New CopperEgg Cloud Sizing Tool Helps Enterprises Choose the Perfect Amazon EC2 Instance", pp. 1-3, retrieved Jun. 4, 2014, <http://copperegg.com/new-copperegg-cloud-sizing-tool-helps-enterprises-choose-the-perfect-amazon-ec2-instance/>.

"Open Data Center Alliance—Usage Models", retrieved Jun. 4, 2014, pp. 1-3, <http://www.opendatacenteralliance.org/ourwork/usagemodels>.

"The Service Catalog: Demystifying Cloud"; Industry Perspectives Jun. 30, 2011, retrieved Jun. 4, 2014, pp. 1-2, <http://www.datacenterknowledge.com/archives/2011/06/30/the-service-catalog-demystifying-cloud/>.

Springer "Complex Service Provisioning in Collaborative Cloud Markets", Lecture Notes in Computer Science, vol. 6994, 2011, pp. 88-99, <http://rd.cpringer.com/chapter/10.1007/978-3-642-24755-2_8>.

Gravitant "Cloud Brokerage for Solution Providers", 2014, <http://www.gravitant.com/the-cloud-brokerage.html>.

U.S. Appl. No. 14/505,799, entitled "Cloud Indpendent Tuning Service for Autonomously Managed Workloads", filed Oct. 3, 2014.

IBM "List of IBM Patents or Patent Applications Treated as Related".

U.S. Appl. No. 14/989,173, entitled "Self-Terminating or Self-Shelving Virtual Machines and Workloads", filed Jan. 6, 2016.

U.S. Appl. No. 15/040,809, entitled "Self-Terminating or Self-Shelving Virtual Machines and Workloads", filed Feb. 10, 2016.

IBM "List of IBM Patents or Patent Applications Treated As Related" (updated).

* cited by examiner

CLOUD INDEPENDENT TUNING SERVICE FOR AUTONOMOUSLY MANAGED WORKLOADS

CROSS-REFERENCE TO RELATED APPLICATION

This application is a continuation of co-pending U.S. patent application Ser. No. 14/505,799, filed Oct. 3, 2014. The aforementioned related patent application is herein incorporated by reference in its entirety.

BACKGROUND

Aspects relate to computer software, and more specifically, to a cloud independent tuning service for autonomously managed workloads.

Service level agreements (SLAs) may define the levels of service being sold by service providers, such as cloud computing providers. SLAs for workload performance in cloud or other virtualized hosting environments are typically static and specific to how that workload might consume resources on a certain operating platform in that hosting environment. These environment-specific SLAs may hamper workload portability across multiple platforms or hosting environments where resources vary greatly. Static SLAs may also increase the amount of work required to generate an SLA for a given workload, because the workload may need to be performance tested in each target platform to determine the correct parameters for the SLA. When a workload outgrows its SLA, the workload has no real-time communication mechanism to renegotiate its SLA with its hosting environment.

Workloads do not have the ability to dynamically span cloud providers. Furthermore, a workload in one cloud provider cannot start using resources or a workload clone in another cloud environment during times of peak usage. Workloads are further unable to easily migrate between different cloud providers, from public to private clouds, between public clouds, and the like. Furthermore, workloads are not able to self-manage their resources in a cloud provider independent manner when they are deployed in cloud providers that do not support self-managed workloads.

SUMMARY

Aspects disclosed herein provide at least systems, methods, and computer program products to perform an operation comprising receiving, from a workload in a cloud computing environment, an abstract request to modify resources allocated to the workload, translating, by a tuning service, the abstract request to a set of requirements to fulfill the abstract request, identifying, by the tuning service, a resource configuration suitable to satisfy the set of requirements, and providing, by the tuning service, the resource configuration to fulfill the abstract request.

DETAILED DESCRIPTION

Aspects disclosed herein allow computing workloads to manage their own resources, or be managed by a cloud computing environment independent resource tuning service (referred to as the "tuning service" herein). In one aspect, the tuning service operates in a "push" mode, where the workload itself proactively uses the tuning service to adjust its own resources based on the workload's own goals in providing a computing service. In another aspect, the tuning service operates in a "pull" mode, where the tuning service monitors the workload and understands the workload's needs in the computing environment, and adjusts the workload's resources accordingly. When configured in a "push" mode, the tuning service may act as a resource request interpreter that allows the workloads to make resource requests using an abstract description of what the workload needs to have adjusted. The requests are "generic" or "abstract" in the sense that workload does not need any domain-specific knowledge about the actual interfaces (or what kind of resource adjustments are even possible) in its current executing environment. In addition, these generic requests may not specify a quantity of a particular resource with any specificity. Instead, the tuning service translates or interprets the generic resource requests, and uses specific computing environment interfaces known to the tuning service in order to make the necessary resource adjustments based on the workload requests. The tuning service may also perform adjustments beyond resource allocations. For example, and without limitation, the tuning service may move the workload to other clouds, clone the workload, and provide environment independent metrics and/or performance monitoring independent of the workload or cloud service that controls the environment where the workload is executing.

Instead of pre-set service level agreements (SLAs) that typically are specific to different resource environments, aspects disclosed herein provide a workload with minimal resources at deployment in order to allow the workload to begin executing. From that point on, in the push configuration, the workload itself may determine its own resource needs based on its own proprietary means of measuring how it provides the services that it was deployed to provide. Additionally or alternatively, in the pull configuration, the tuning service monitors the workload using workload administrator defined rules to determine the needs of the workload.

Figure 1:
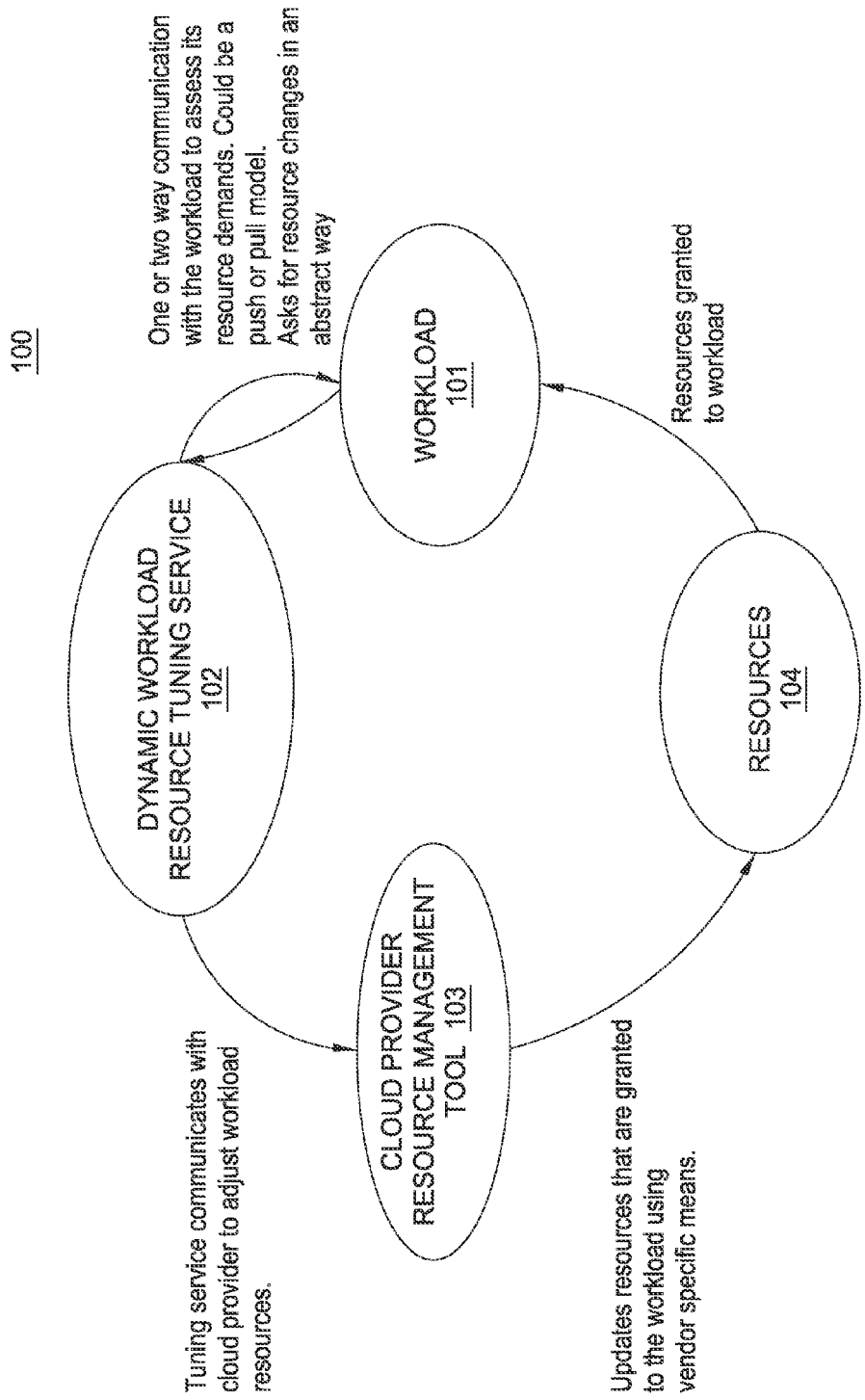
FIG. 1 is a schematic illustrating a cloud independent tuning service for autonomously managed workloads, according to one aspect.

FIG. 1 is a schematic illustrating a logical view of a system 100 implementing a cloud independent tuning service for autonomously managed workloads, according to one aspect. As shown, the system 100 includes a workload 101, a dynamic workload resource tuning service (referred to as the "tuning service") 102, a cloud provider resource management tool 103, and resources 104. Although one workload 101 is depicted, the system 100 is capable of executing more than one workload concurrently or sequentially. Generally, the workload 101 may be any computing task that executes on resources 104. The resources 104 may be any computing resource, hardware, software, or any combination thereof. The cloud provider management tool 103 is an interface used to manage resources 104 in the cloud computing environment.

The tuning service 102 is a service that may operate in the push or pull models described above in order to provide platform independent resource management. In the push model, the workload 101 may request resource adjustments in an abstract manner. The tuning service 102 may translate the abstract requests to specific requirements that must be met to fulfill the abstract request. For example, the workload 101 may monitor its own performance in light of its goals of providing a service, and issue an abstract request indicating "I need more memory." The tuning service 102 may analyze the current resource configuration to determine that the workload is currently allocated 1 gigabyte of memory. The tuning service 102 may therefore determine that the workload 101 requires another gigabyte of memory. The tuning service 102 may then use one or more APIs of the cloud provider resource management tool 103 to request one additional gigabyte of memory from the resources 104. The management tool 103 may then allocate the additional gigabyte of memory to the workload 101.

In the pull model, the tuning service 102 may monitor the performance of the workload 101 in order to determine that the workload may be resource constrained. For example, the tuning service 102 may determine that the workload 101 has a high level of processor utilization. The tuning service 102 may receive the workload's resource utilization metrics from the workload or the cloud provider. The tuning service 102 may be programmed to understand that the cloud provider is unable to dynamically adjust the processors granted to the workload 101, but that the cloud provider supports cloning workloads. The tuning service 102 may then use the cloud provider's APIs to communicate with the management tool 103 in order to clone the workload 101, relieving the processing constraints.

In order to operate in the push configuration, the workload 101 may be configured with the information and communication protocols necessary to find and communicate what resource adjustments it needs to the tuning service 102. In response, the tuning service 102 may consider where the workload 101 resides and how the cloud provider allows for the resources 104 to be adjusted. In the pull configuration, the workload 101 may be registered with the tuning service 102 by a system administrator in order to allow the tuning service 102 to pull information from the workload 101 and monitor the workload 101. In the pull model, the workload 101 does not have to make any specific requests for resource adjustments, as the control of its resources is based on what the tuning service 102 knows about the registered workload 101, its environment, and how the management tool 103 allows for the resources 104 to be adjusted for the workload 101.

The generic requests issued by the workload 101 to the tuning service in the push model need not be specific to the environment or cloud provider the workload 101 operates in. The tuning service 102 may translate these requests into specific tuning requests that are understood by the management tool 103. In the push model, only the tuning service 102 makes specific resource adjustment requests (on behalf of the workload 101). Therefore, the tuning service 102 may use the specific cloud provider representational state transfer (REST) application program interfaces (APIs), asynchronous messaging, or any other means to communicate the resource adjustment requests to the management tool 103.

By providing the tuning service external to the workload and the cloud provider, aspects disclosed herein allow the workload 101 to be cloud provider independent. (In at least one aspect, however, the tuning service may be a component of the workload itself). Being cloud provider independent also allows the tuning service 102 to have various translation modules to communicate with various cloud provider and resource management tools, whereby the tuning service 102 is capable of tuning workloads in different environments. Furthermore, aspects disclosed herein do not require the workload 101 or the cloud provider to know how the resource tuning works at all, or even that the workload 101 is being tuned in conjunction with an external independent tuning service 102. This allows the tuning service 102 to tune workloads in environments that have not implemented self-managed workloads.

The independent nature of the tuning service 102 allows the tuning service 102 to clone new workloads within a cloud provider if the tuning service 102 determines that doing so would satisfy an existing workload's resource needs. For example, during a peak load time for the workload 101, the workload may request (in abstract form) more resources from the tuning service 102. The tuning service 102 may know that the workload is in an environment that supports workload cloning, and may determine that the best way to satisfy the abstract request is to clone the workload 101. The tuning service 102 may then use the cloud provider's REST APIs to clone another instance of the workload 101.

In addition, as the tuning service 102 is independent of any specific cloud environment, the tuning service 102 may be used to adjust or clone a workload 101 that spans multiple cloud environments, or increase and/or decrease resources being utilized in one particular cloud during peaks and valleys of workload 101 usage based on rules such as the cost of resources in various clouds. The tuning service may move the workload 101 from one cloud to another cloud, while the resource managers (such as the management tool 103) on the clouds involved do not need to know the existence or availability of the other clouds, or how to start or move the workload 101 between clouds.

Furthermore, because the tuning service 102 is multi-cloud aware, the tuning service 102 can keep a record of how the workload 101 performs when running with specific resources 104 on various clouds. The tuning service 102 may use this information to learn how the workload 101 requests resources (using the push model), or how it performs on any specific cloud (in the pull model). The tuning service 102 may use this historic tuning pattern information to adjust the tuning service 102 for instances of that workload 101 in the various environment clouds where the tuning service 102 has been used to manage the resources 104 allocated to the workload 101.

Figure 2:
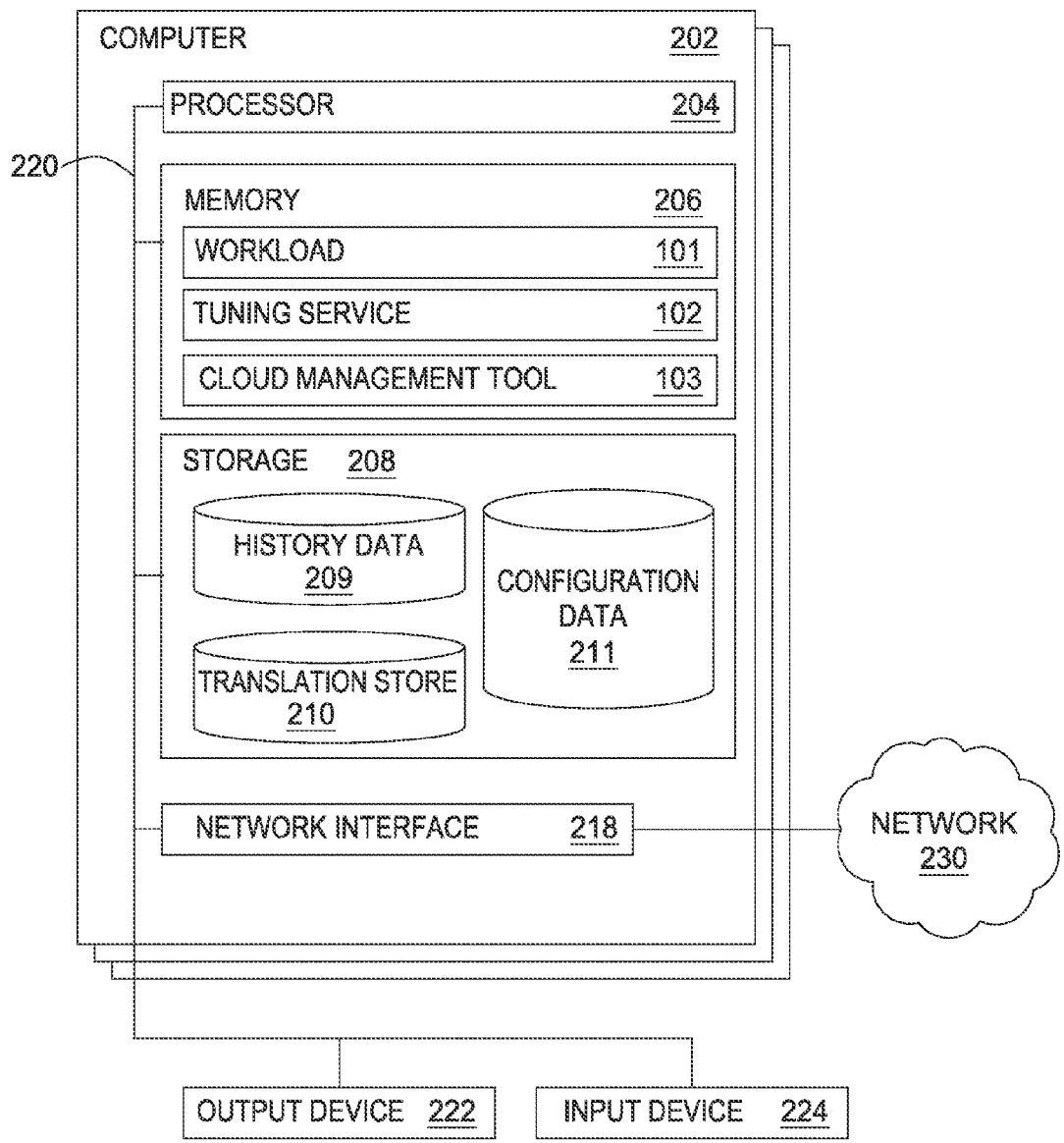
FIG. 2 is a block diagram illustrating a system implementing a cloud independent tuning service for autonomously managed workloads, according to one aspect.

FIG. 2 is a block diagram illustrating a system 200 implementing a cloud independent tuning service for autonomously managed workloads. The networked system 200 includes a computer 202. The computer 202 may also be connected to other computers 202 via a network 230. In general, the network 230 may be a telecommunications network and/or a wide area network (WAN). In a particular aspect, the network 230 is the Internet. The computers 202 may be part of the same or different cloud computing environments.

The computer 202 generally includes a processor 204 connected via a bus 220 to a memory 206, a network interface device 218, a storage 208, an input device 222, and an output device 224. The computer 202 is generally under the control of an operating system (not shown). Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 204 is included to be representative of a single CPU, multiple CPUs, a single CPU having multiple processing cores, and the like. The network interface device 218 may be any type of network communications device allowing the computer 202 to communicate with other computers via the network 230.

The storage 208 may be a persistent storage device. Although the storage 208 is shown as a single unit, the storage 208 may be a combination of fixed and/or removable storage devices, such as fixed disc drives, solid state drives, SAN storage, NAS storage, removable memory cards or optical storage. The memory 206 and the storage 208 may be part of one virtual address space spanning multiple primary and secondary storage devices.

The input device 222 may be any device for providing input to the computer 202. For example, a keyboard and/or a mouse may be used. The output device 224 may be any device for providing output to a user of the computer 202. For example, the output device 224 may be any conventional display screen or set of speakers. Although shown separately from the input device 222, the output device 224 and input device 222 may be combined. For example, a display screen with an integrated touch-screen may be used.

As shown, the memory 206 contains the workload 101, the tuning service 102, and the management tool 103. The tuning service 102 may be configured to modify resource allocations for the workload 101, move the workload 101, and clone the workload 101 in order to dynamically tune the performance of the workload 101. As previously described, the tuning service 102 is a service configured to translate abstract requests issued by the workload 101 and interface with the management tool 103 in order to fulfill the requests issued by the workload 101. In another aspect, the tuning service 102 may be configured to pull resource utilization levels of the workload 101, and interface with the management tool 103 in order to change the current resource allocation for the workload 101.

For example, the workload 101 may be programmed with a goal of providing low-cost service to clients. In the push model, the workload 101 may realize that its current resource allocation is greater than its current needs. In such a case, the workload 101 may send an abstract request to the tuning service 102 indicating "please save me some money." The tuning service 102 may translate the request to a specific request based on a mapping in the translation store 210. For example, the translation store 210 may provide a set of abstractions that allow the tuning service 102 to determine that reducing some resource allocations will result in cost savings to the workload 101. For example, the tuning service 102 may determine that the abstract request requires the reduction of at least two resource allocations, such as memory and network bandwidth. As a result, the tuning service 102 may reference the configuration data 211 in order to generate a specific request understandable by the management tool 103 to reduce the memory and network bandwidth allocated to the workload 101.

As shown, storage 208 contains the history data 209, the translation store 210, and configuration data 211. The history data 209 may include resource utilization levels of different workloads under different resource allocations. The tuning service 102 may periodically pull the utilization data according to a predefined schedule. The translation store 210 may generally include information that allows the tuning service 102 to convert abstract requests from the workloads to specific requests understandable by the management tool 103. In at least one aspect, the tuning service 102 is configured to access information from external sources in order to translate the abstract resource requests from the workload 101. For example, if the workload 101 issues an abstract request indicating "I want to perform better than my competitor," the tuning service 102 may access remote information indicating how the competitor's workloads are currently configured. The tuning service 102 may determine that the competitor runs on three processors, while the workload currently operates on two processors. As a result, the tuning service 102 may issue a request to the management tool 103 to allocate two additional processors to the workload 101, so that the workload 101 executes on more processors than its competitor. The configuration data 211 may include general configuration information for the tuning service 102, goals of the workload 101, capabilities of each of a plurality of cloud providers, and APIs or libraries that allow the tuning service 102 to communicate with each cloud provider. In at least one aspect, the tuning service 102 is a component of the workload 101.

Figure 3:
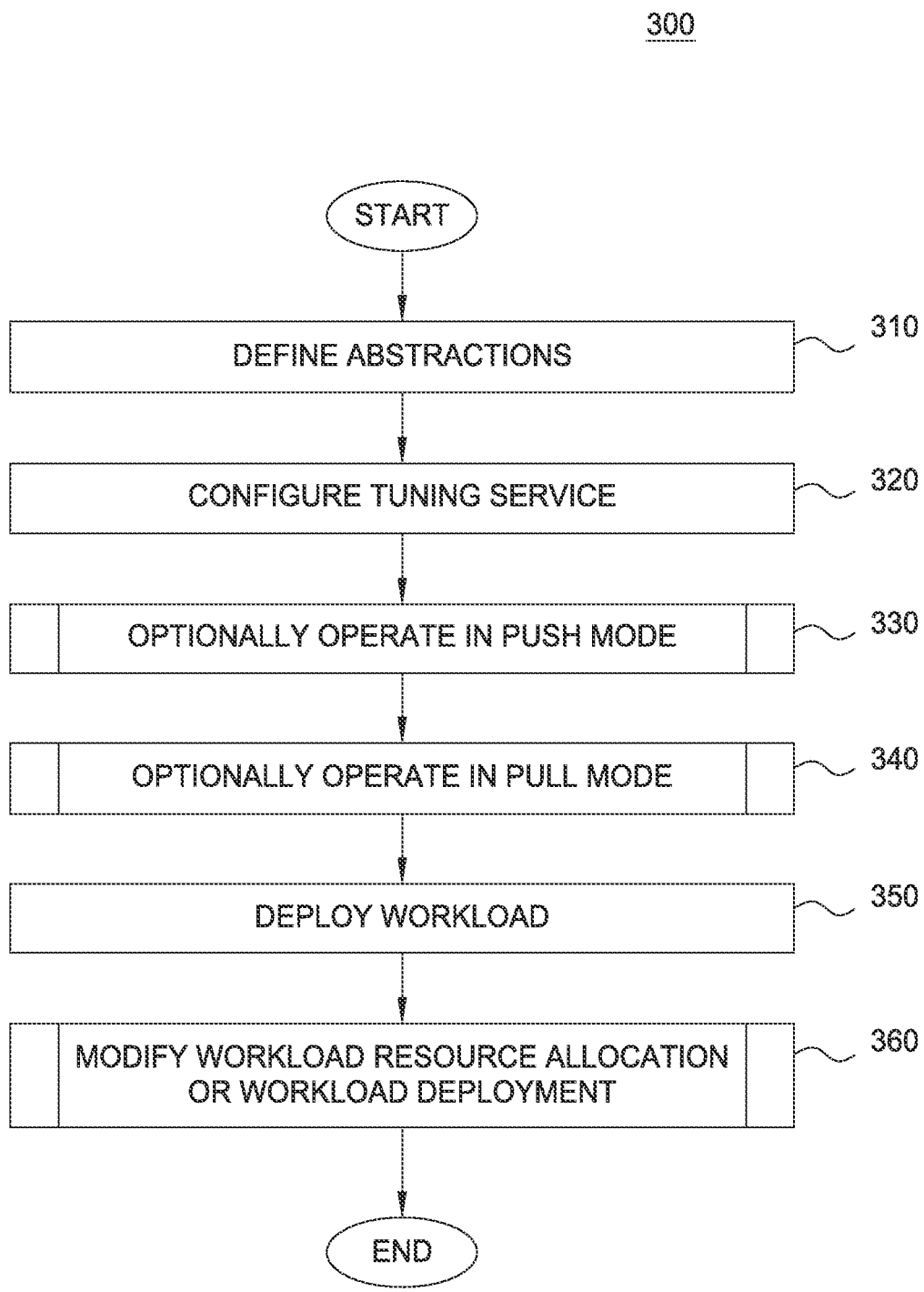
FIG. 3 is a flow chart illustrating a method for a cloud independent tuning service for autonomously managed workloads, according to one aspect.

FIG. 3 is a flow chart illustrating a method 300 for a cloud independent tuning service for autonomously managed workloads, according to one aspect. Generally, the steps of the method 300 provide the tuning service 102 to workloads in a cloud computing environment, allowing the workload to manage its own resources based on its own performance goals (which may not always include optimized performance). Alternatively, the tuning service 102 may manage the workload's resources by pulling resource utilization data, and requesting modification of the workload's resources based on the pulled resource utilization data.

The method 300 begins at step 310, where different abstractions are defined and stored in the translation store 210. The abstractions may be of any type and related to any need of the workloads. For example, a request for "more speed" may be associated with one or more of processors, memory, disk I/O, and network speeds (or quality of service). At step 320, the tuning service 102 may be configured to operate in a platform-independent manner. The configuration may include defining configuration data 211 for the tuning service 102, and may include any type of settings to facilitate the platform independent nature of the tuning service 102. For example, the capabilities, APIs, pricing schemes, and related data for each of a plurality of cloud providers may be defined in the configuration data 211. Additionally, global limits for resource assignment may be defined in the configuration data 211, or a cognitive learning service could be used to configure the tuning service 102.

At step 330, described in greater detail with reference to FIG. 4, the tuning service 102 may optionally operate in the push mode, where the workload issues abstract resource requests to the tuning service 102. The tuning service 102 may then translate those requests into actual parameters or criteria that need to be allocated in order to fulfill the abstract request (if at all possible). The tuning service 102 may then request modifications to the resources allocated to the workload, move the workload, or clone the workload in order to fulfill the abstract request.

At step 340, described in greater detail with reference to FIG. 5, the tuning service 102 may operate in the pull mode, where the tuning service 102 pulls resource utilization levels of each of a plurality of services. The tuning service 102 may be aware of the goals of the workload, and modify resource allocations in order to ensure the workload's goals are met. The tuning service 102 may further move or clone the workload in order to fulfill the workload's goals. Although the method 300 describes steps 330 and 340 as occurring sequentially, generally, one mode of operation is selected (either push or pull mode), and the tuning service 102 operates accordingly. In at least some aspects, the tuning service 102 may dynamically change between push and pull modes, resulting in a hybrid push/pull mode. For example, the tuning service 102 may operate in pull mode, actively adjusting a workload. The workload may then, in push mode, override the requests when a threshold is reached. More specifically, the tuning service 102 could be adding resources to a workload to make it better than the competition when at some point the workload decides its performance is good enough and pushes an override stopping the addition of resources to maintain cost.

At step 350, a workload may be deployed in a hosting environment, such as a cloud computing environment. In the initial deployment at step 350, the tuning service 102 may ensure that the workload is provided with a minimal set of resources, which may then be modified as needed. At step 350, described in greater detail with reference to FIG. 6, the workload and/or the tuning service 102 may modify the workload's resource allocation or the workload's deployment as needed. For example, the tuning service 102 may allocate additional resources, remove existing resources, move the workload, or clone the workload.

Figure 4:
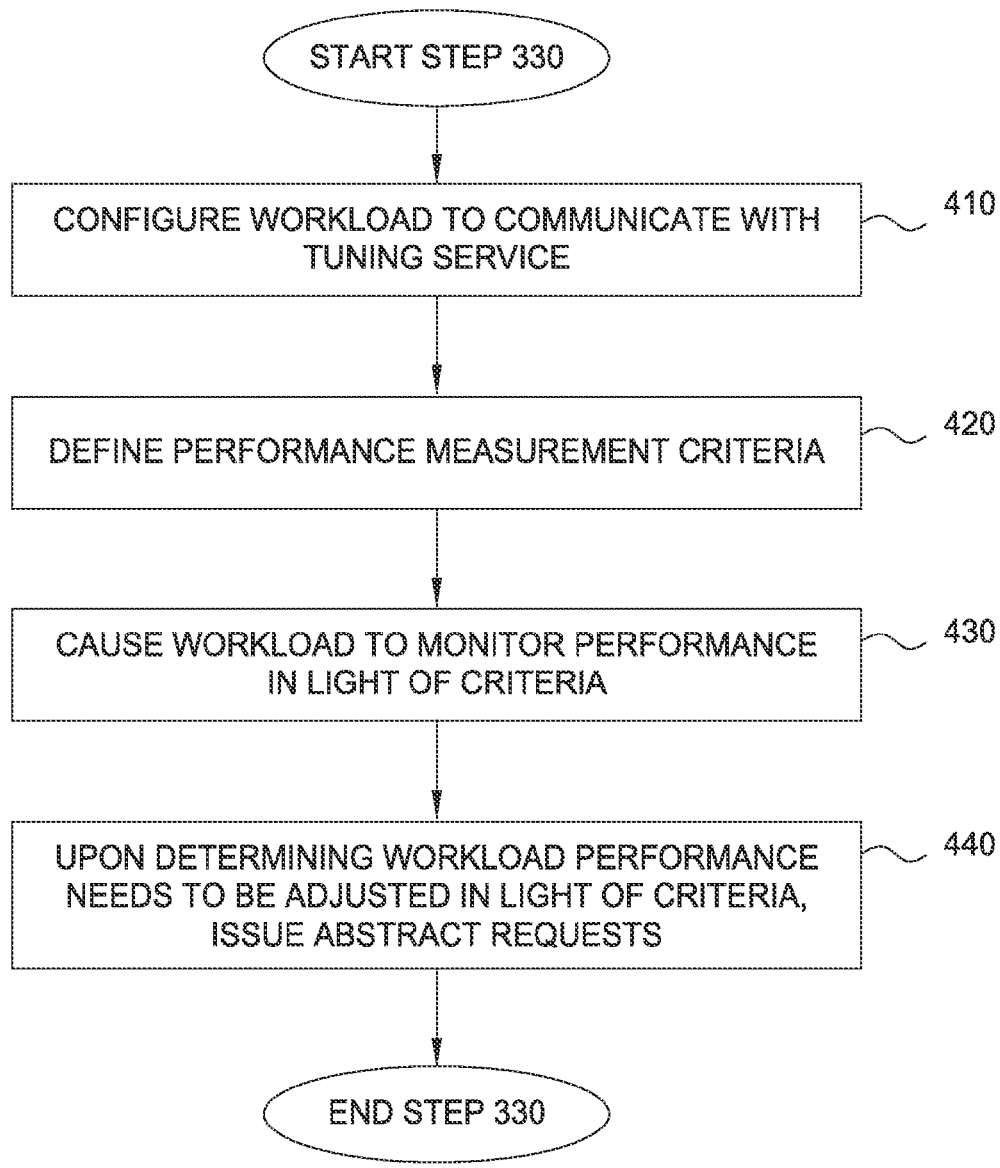
FIG. 4 is a flow chart illustrating a method to operate a workload in a push mode, according to one aspect.

FIG. 4 is a flow chart illustrating a method 400 corresponding to step 330 to operate a workload in a push mode, according to one aspect. Although the steps of the method 400 are discussed with the tuning service 102 being external to the workload 101, in at least one aspect, the tuning service 102 is a component of the workload itself. At step 410, the workload may be configured to communicate with the tuning service 102. The configuration may include a location of the tuning service 102, a network address of the tuning service 102, and the like. In addition, the workload may be configured to make abstract requests. The workload may be programmed with logic to enable itself to assess its performance and issue abstract requests to modify resource utilizations in order to better fulfill its predefined objectives or goals. At step 420, performance measurement criteria for the workload may be defined. For example, resource allocation and utilization levels may be defined for traditional computing resources (such as network bandwidth, CPU, disk, and memory). In addition, goals and other attributes of the workload may be defined. For example, the workload may have a goal of being energy efficient, and energy utilization levels may be defined.

At step 430, the workload 101 may monitor its own performance in light of its defined criteria and goals. For example, the workload 101 may monitor its own network bandwidth usage. At step 440, the workload 101 may issue an abstract request to the tuning service 102 upon determining that the performance needs to be adjusted in light of its own criteria, objectives, or goals. For example, the workload 101 may determine that it has exhausted network bandwidth based on the monitoring at step 430. The workload 101 may then issue a request to the tuning service 102 specifying "more bandwidth is needed." As a result, the tuning service would translate the request, and communicate with the cloud management tool 103 that the workload 101 should be allocated an extra gigabit of network bandwidth. The workload 101 may then utilize the additional bandwidth until the peak usage subsides. At such a point, the workload 101 may then determine that its bandwidth utilization has fallen below a threshold percentage. As such, the workload may issue an abstract request to the tuning service 102 to "reduce network bandwidth." The tuning service 102 may then translate the request, and ask the management tool 103 to remove a gigabit of bandwidth from the bandwidth allocated to the workload 101.

Figure 5:
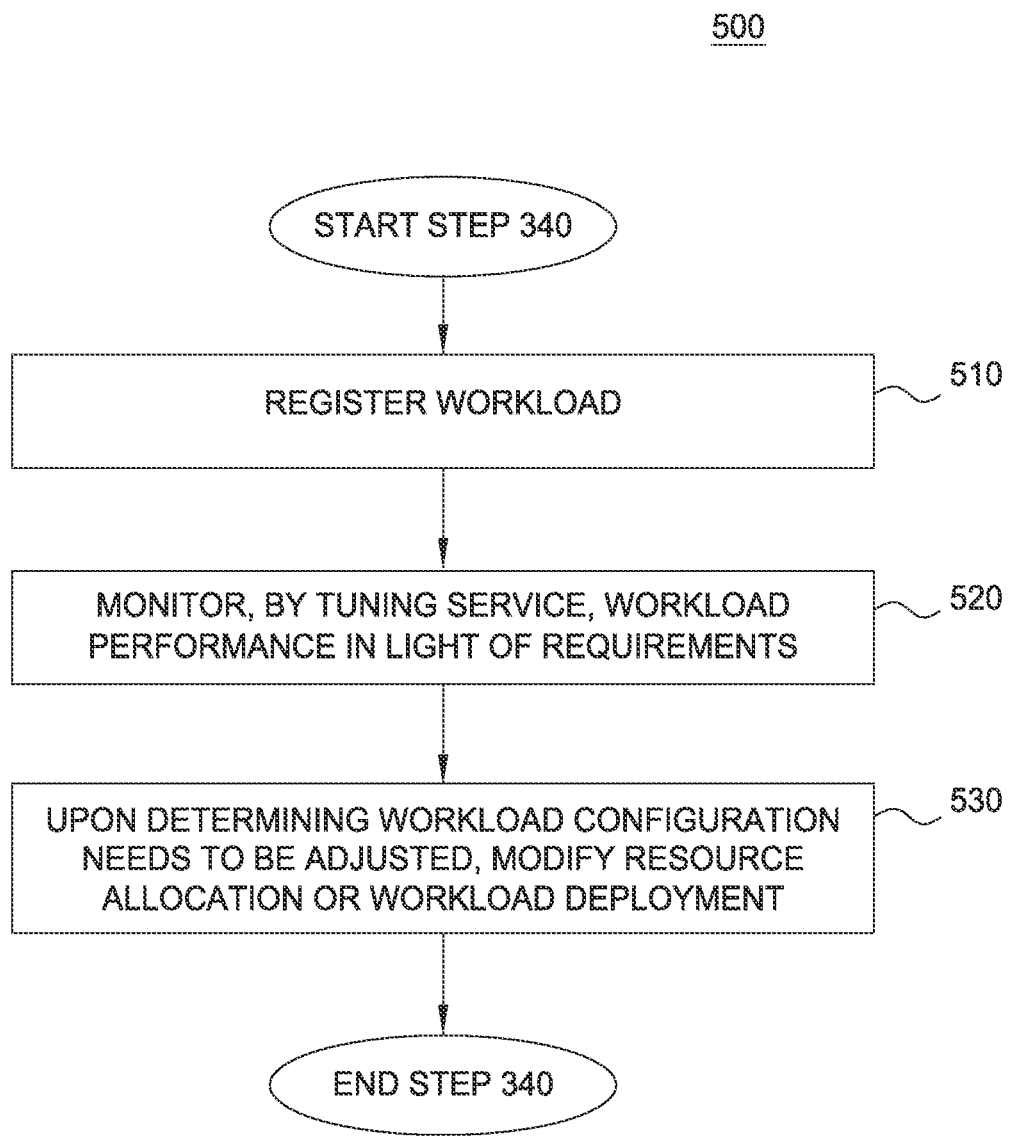
FIG. 5 is a flow chart illustrating a method to operate a workload in a pull mode, according to one aspect.

FIG. 5 is a flow chart illustrating a method 500 corresponding to step 340 to operate a workload in a pull mode, according to one aspect. Generally, in the pull mode, the tuning service 102 monitors the resource usage of a registered workload, and adjusts the resource allocation and/or deployment of the workload based on the current resource usage. At step 510, the workload 101 may be registered with the tuning service 102 by a system administrator in order to allow the tuning service 102 to pull information from the workload 101 and monitor the workload 101. At step 520, the tuning service 102 may monitor the workload's performance in light of the workload's performance requirements, criteria, and goals. At step 530, the tuning service 102 may modify the resources allocated to the workload or change the workload's deployment upon determining that the workload's configuration needs to be adjusted. For example, if the tuning service 102 determines that the workload is only utilizing 10% of its allocated memory, the tuning service 102 may cause the management tool 103 to remove 50% of the memory allocated to the workload. If the tuning service 102 determines that the workload is utilizing 95% of its allocated memory, the tuning service 102 may request more memory from the management tool 103. Still further, the tuning service 102 may move the workload to another environment having more memory. Even further still, the tuning service 102 may clone the workload in order to relieve the memory constraints.

Figure 6:
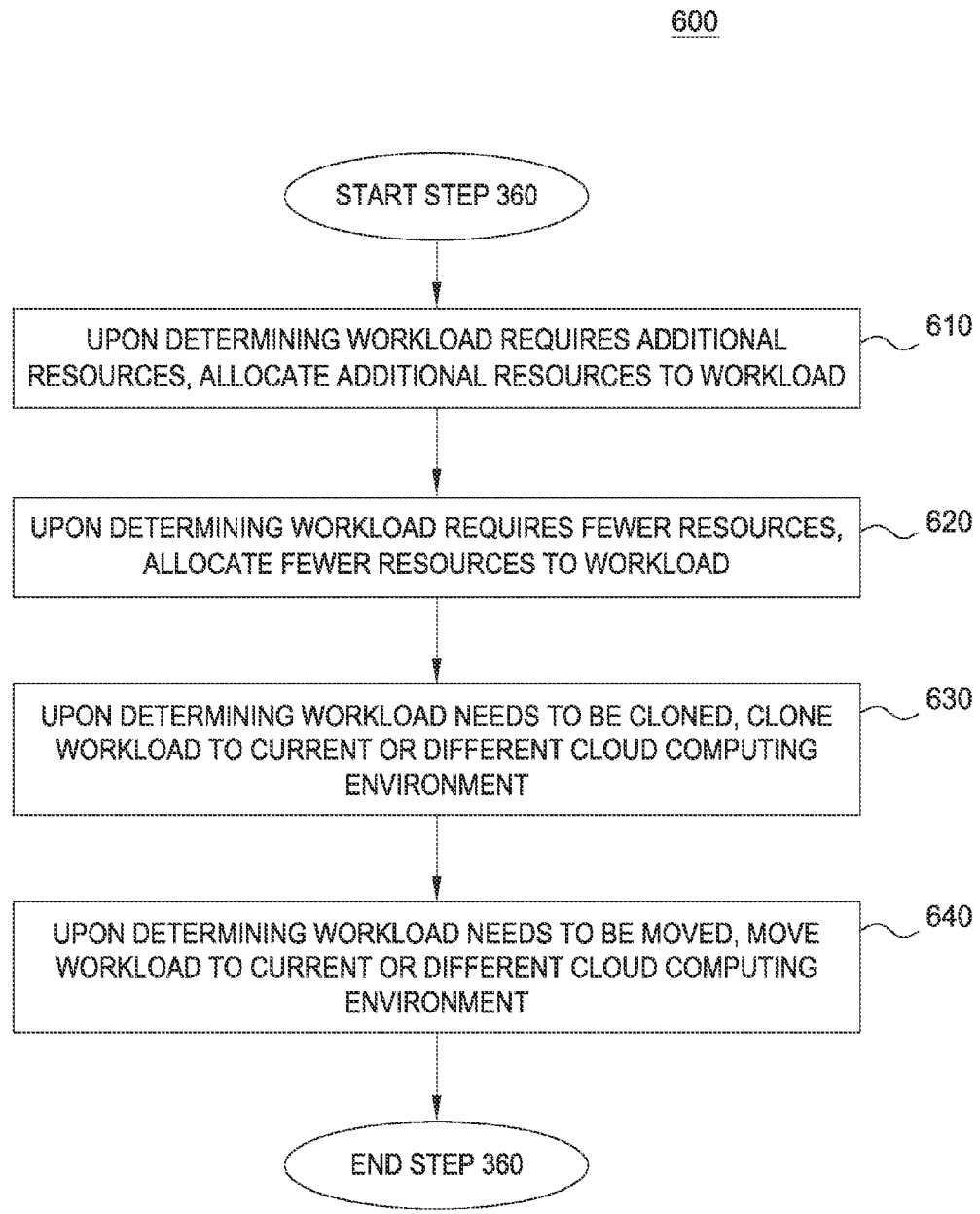
FIG. 6 is a flow chart illustrating a method to modify a workload resource allocation or workload deployment, according to one aspect.

FIG. 6 is a flow chart illustrating a method 600 corresponding to step 360 to modify a workload resource allocation or workload deployment, according to one aspect. Generally, the tuning service 102 may perform the steps of the method 600 in order to add or remove resources from a workload, to clone the workload, or move the workload based on any number of factors. At step 610, upon determining the workload 101 requires additional resources, the tuning service 102 may request additional resources for the workload 101 from the management tool 103. In response, the management tool 103 may allocate the additional resources to the workload 101. At step 620, upon determining the workload 101 requires fewer resources, the tuning service 102 may request fewer resources for the workload 101 from the management tool 103. In response, the management tool 103 may remove some resources allocated to the workload 101. At step 630, the tuning service 102 may cause the workload 101 to be cloned upon determining that the workload needs to be cloned. The workload 101 may be cloned in the current cloud computing environment (if supported), or in a different cloud computing environment. At step 640, the tuning service 102 may cause the workload 101 to be moved upon determining that the workload needs to be moved. The workload 101 may be moved to a different host in the current cloud computing environment (if supported), or to a host in a different cloud computing environment.

It is understood in advance that although this disclosure includes a detailed description on cloud computing, implementation of the teachings recited herein are not limited to a cloud computing environment. Rather, aspects are capable of being implemented in conjunction with any other type of computing environment now known or later developed.

For convenience, the Detailed Description includes the following definitions which have been derived from the "Draft NIST Working Definition of Cloud Computing" by Peter Mell and Tim Grance, dated Oct. 7, 2009, which is cited in an IDS filed herewith, and a copy of which is attached thereto.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
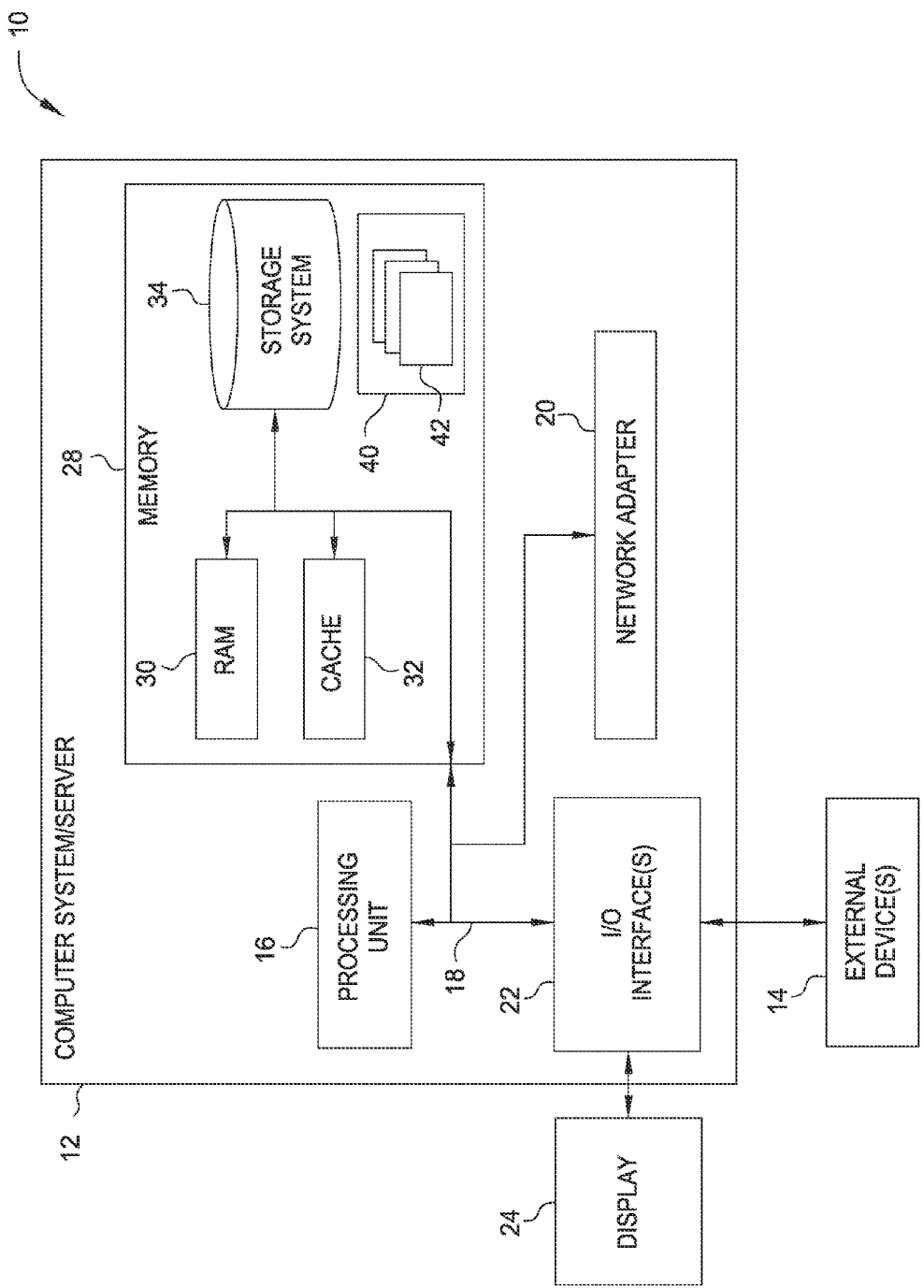
FIG. 7 depicts a cloud computing node according to one aspect.

Referring now to FIG. 7, a schematic of an example of a cloud computing node is shown. Cloud computing node 10 is only one example of a suitable cloud computing node and is not intended to suggest any limitation as to the scope of use or functionality of aspects described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 94 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 18 may include at least one program product having a set (e.g., at least one) of program modules that are configured to carry out the functions of aspects disclosed herein.

Program/utility 40, having a set (at least one) of program modules 42, may be stored in memory 88 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of aspects as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 8:
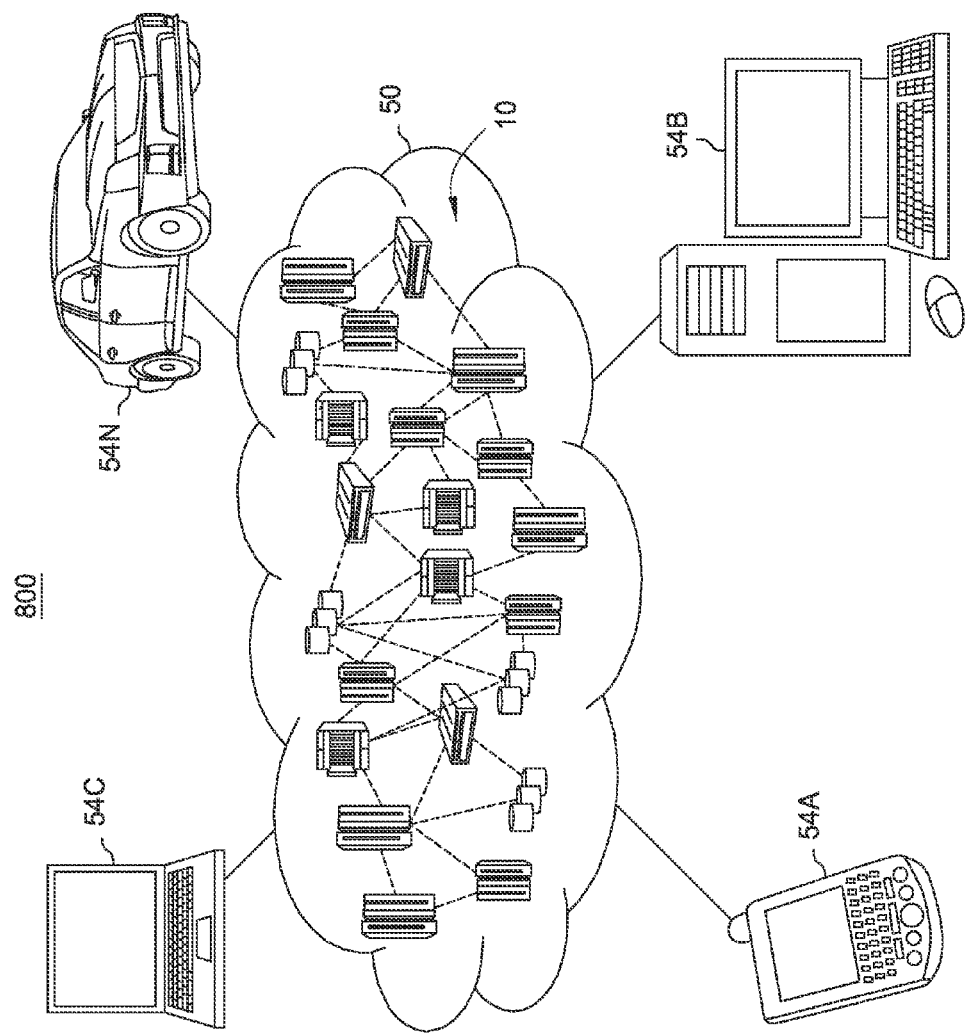
FIG. 8 depicts a cloud computing environment according to one aspect.

Referring now to FIG. 8, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
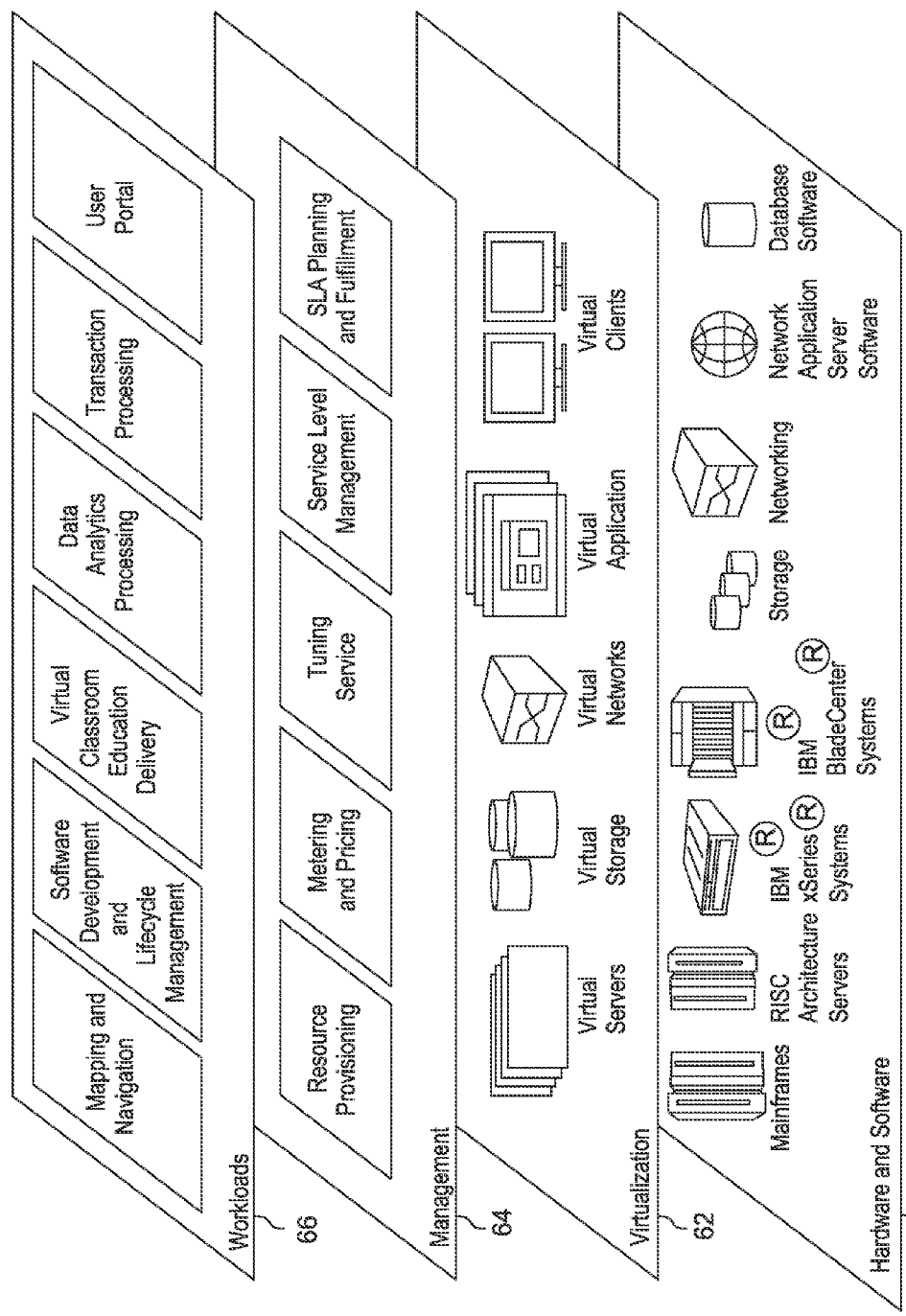
FIG. 9 depicts abstraction model layers according to one aspect.

Referring now to FIG. 9, a set of functional abstraction layers provided by cloud computing environment 50 (FIG. 8) is shown. It should be understood in advance that the components, layers, and functions shown in FIG. 9 are intended to be illustrative only and aspects are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. The tuning service provides support for workload managed resource modifications based on abstract requests from a workload. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and user portals.

The descriptions of the various aspects have been presented for purposes of illustration, but are not intended to be exhaustive or limited to the aspects disclosed. Many modifications and variations will be apparent to those of ordinary skill in the art without departing from the scope and spirit of the described aspects. The terminology used herein was chosen to best explain the principles of the aspects, the practical application or technical improvement over technologies found in the marketplace, or to enable others of ordinary skill in the art to understand the aspects disclosed herein.

In the following, reference is made to aspects presented in this disclosure. However, the scope of the present disclosure is not limited to specific described aspects. Instead, any combination of the following features and elements, whether related to different aspects or not, is contemplated to implement and practice contemplated aspects. Furthermore, although aspects disclosed herein may achieve advantages over other possible solutions or over the prior art, whether or not a particular advantage is achieved by a given aspect is not limiting of the scope of the present disclosure. Thus, the following aspects, features, aspects and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects may take the form of an entirely hardware aspect, an entirely software aspect (including firmware, resident software, micro-code, etc.) or an aspect combining software and hardware aspects that may all generally be referred to herein as a "circuit," "module" or "system."

Aspects disclosed herein may be a system, a method, and/or a computer program product. The computer program product may include a computer readable storage medium (or media) having computer readable program instructions thereon for causing a processor to carry out the different aspects.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects disclosed herein.

Aspects are described herein with reference to flowchart illustrations and/or block diagrams of methods, apparatus (systems), and computer program products according to the aspects. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to aspects, other and further aspects may be devised without departing from the basic scope thereof, and the scope thereof is determined by the claims that follow.

What is claimed is:

1. A method, comprising:
   receiving, by a tuning service from a workload in a first cloud computing environment based on a performance measurement criteria comprising a level of energy utilization realized by executing the workload on a host machine in the first cloud computing environment, an abstract request generated by the workload specifying to modify resources allocated to the workload, wherein the abstract request does not specify a modified quantity of a first resource required to fulfill the abstract request;
   translating, by the tuning service, the abstract request to a set of requirements to fulfill the abstract request, wherein the set of requirements specifies to modify the first resource to reduce the level of energy utilization below a energy utilization threshold;
   identifying, by the tuning service based on a current resource configuration of the workload, a modified resource configuration suitable to provide the modified quantity of the first resource required to fulfill the abstract request;
   generating, by the tuning service based on the modified resource configuration, a specific request compatible with a representational state transfer (REST) application programming interface (API) of a resource management component of the first cloud computing environment; and
   providing, by the tuning service, the specific request to the REST API of the resource management component of the first cloud computing environment, wherein the resource management component of the first cloud computing environment generates the modified resource configuration including the modified quantity of the first resource responsive to the specific request to fulfill the abstract request.

2. The method of claim 1, wherein the tuning service is external to the first cloud computing environment, wherein the specific request specifies the quantity of the first resource in a format compatible with the REST API of the resource management component, wherein the current resource configuration specifies a current quantity of the first resource allocated to the workload, wherein the modified resource configuration further comprises a second computing resource, wherein the first and second computing resources respectively comprise at least one of: (i) a hardware resource, (ii) a quality of service, and (iii) a software resource provided to the workload.

3. The method of claim 1, wherein the modified resource configuration specifies to move the workload to a different cloud computing environment.

4. The method of claim 1, wherein the modified resource configuration specifies to clone the workload.

5. The method of claim 1, wherein the abstract request comprises a generic request that is agnostic relative to the REST API of the resource management component of the first cloud computing environment.

6. The method of claim 1, wherein a resource utilization of the workload is monitored by: (i) the workload, and (ii) the tuning service.

7. The method of claim 1, wherein the first cloud computing environment provides a baseline level of resources to the workload upon deployment, wherein the workload and the tuning service are configured to modify the baseline level of resources independent of the configuration of the first cloud computing environment.

8. The method of claim 1, wherein the performance measurement criteria further comprise: (i) an allocation level for each of a plurality of hardware resources including the first resource, (ii) a utilization level for each of the plurality of hardware resources including the first resource, and (iii) a cost of executing the workload in the cloud computing environment.

9. The method of claim 8, wherein the workload generates the request upon determining that the level of energy utilization exceeds the energy utilization threshold.

10. The method of claim 9, wherein the modified resource configuration specifies to move the workload to a second cloud computing environment, the method further comprising:
    moving, by the tuning service, the workload from the first cloud computing environment to the second cloud computing environment.

11. The method of claim 10, further comprising:
    receiving, from the workload in the second cloud computing environment, a second abstract request specifying to modify resources allocated to the workload in the second cloud computing environment, wherein the second abstract request does not specify a modified quantity of a second resource required to fulfill the second abstract request;

translating, by the tuning service, the second abstract request to a set of requirements to fulfill the second abstract request in the second cloud computing environment, wherein the set of requirements to fulfill the second abstract request specifies to modify the second resource;

identifying, by the tuning service based on a current resource configuration of the workload in the second cloud computing environment, a second modified resource configuration suitable to provide the modified quantity of the second resource in the second cloud computing environment;

generating, by the tuning service based on the second modified resource configuration, a second specific request compatible with a representational state transfer (REST) application programming interface (API) of a resource management component of the second cloud computing environment;

providing, by the tuning service, the second specific request to the REST API of the resource management component of the second cloud computing environment, wherein the resource management component of the second cloud computing environment generates the second modified resource configuration including the modified quantity of the second resource responsive to the second specific request to fulfill the second abstract request.

* * * * *